US006175771B1

(12) United States Patent
Hunt et al.

(10) Patent No.: US 6,175,771 B1
(45) Date of Patent: Jan. 16, 2001

(54) LIGHTING COMMUNICATION ARCHITECTURE

(75) Inventors: Mark A. Hunt, Derby; William Hewlett, Birmingham; Ian Clarke, Walsall, all of (GB)

(73) Assignee: Light & Sound Design Ltd., Birmingham (GB)

( * ) Notice: Under 35 U.S.C. 154(b), the term of this patent shall be extended for 0 days.

(21) Appl. No.: 09/033,893

(22) Filed: Mar. 3, 1998

Related U.S. Application Data

(60) Provisional application No. 60/038,137, filed on Mar. 3, 1997.

(51) Int. Cl.[7] .................................................... G05B 19/18

(52) U.S. Cl. ................................ 700/3; 362/85; 362/233; 315/316

(58) Field of Search ............................ 700/83, 3; 362/85, 362/233; 315/316

(56) References Cited

U.S. PATENT DOCUMENTS

| | | | | |
|---|---|---|---|---|
| 3,845,351 | * | 10/1974 | Ballmoos et al. | 315/293 |
| 3,898,643 | * | 8/1975 | Ettlinger | 700/84 |
| 4,392,187 | * | 7/1983 | Bornhorst | 362/233 |
| 4,511,824 | * | 4/1985 | Goddard | 315/297 |
| 4,550,276 | * | 10/1985 | Callahan et al. | 315/312 |
| 4,716,344 | * | 12/1987 | Newell et al. | 315/312 |
| 4,797,795 | * | 1/1989 | Callahan | 362/233 |
| 4,837,665 | * | 6/1989 | Hoyer et al. | 362/96 |
| 4,980,806 | * | 12/1990 | Taylor et al. | 362/85 |
| 5,010,459 | * | 4/1991 | Taylor et al. | 362/85 |
| 5,209,560 | * | 5/1993 | Taylor et al. | 362/85 |
| 5,329,431 | * | 7/1994 | Taylor et al. | 362/85 |
| 5,406,176 | * | 4/1995 | Sugden | 315/292 |
| 5,502,627 | * | 3/1996 | Hunt et al. | 362/286 |
| 5,590,955 | * | 1/1997 | Bornhorst et al. | 362/324 |
| 5,668,537 | * | 9/1997 | Chansky et al. | 340/825.06 |
| 5,769,527 | * | 6/1998 | Taylor et al. | 362/85 |
| 6,020,825 | * | 2/2000 | Chansky et al. | 340/815.5 |

* cited by examiner

*Primary Examiner*—William Grant
*Assistant Examiner*—Edward F. Gain
(74) *Attorney, Agent, or Firm*—Fish & Richardson P.C.

(57) ABSTRACT

An improved lighting control architecture provides many different kinds of controlling options. A single channel per line communication is described. This can be used to form single channel DMX to communicate with DMX format luminaires, while still using only one communication per line. The controlling console has only a single connector that outputs information for all luminaires. This is connected to a distribution rack, which itself includes plural connectors but spaced from the console. The multiple connectors can represent communications in many different formats including format of one lamp per line, or time division multiplexed formats of many lamps per line.

9 Claims, 7 Drawing Sheets

LIGHTING COMMUNICATION ARCHITECTURE

This application claims the benefit of U.S. Provisional application Ser. No. 60/038,137, filed Mar. 3, 1997.

FIELD OF THE INVENTION

The present disclosure describes a lighting system having a special architecture adapted for communicating between a lighting control console and a plurality of lighting instruments. More specifically, the present disclosure describes a system which allows the use of multiple format lighting communication protocols; each preferably communicating with the console over a dedicated channel.

BACKGROUND AND SUMMARY

Modern stage lighting systems include extremely sophisticated control structures. The lighting is controlled by a sophisticated console. Many different lighting effects and operations can be controlled by that console. The console usually controls a number of lighting units. Each lighting unit communicates with the console over a channel, typically via a wire connection.

Many different companies make electronically-controlled lighting equipment ("luminaires") that are controllable from such a console. Each of these different luminaires has some differences in its operation and control.

One trend in the art has been to run a common wire to a group of lighting units. This common wire has information that communicates with all of the units, using some form of multiplexed communication. For example, one commonly-used form of communication is the USITT DMX 512 communication protocol. This protocol allows a number of lamps to communicate over a single line. DMX time division multiplexes the information to form a stream of information that has different parameter commands at different times. Each parameter command is meant for controlling a different lamp. The lamp responds only to time slots representing information for that particular lamp. That information is located in its assigned time slot.

An alternative but somewhat related multiplexing technique assigns an address to each lamp. The "series 200" format from VARI-LITE, INC.™ uses this technique.

A description of an addressed format can be found in U.S. Pat. No. 4,980,806, the description of which is incorporated by reference. Each lamp in an addressed system responds only to information which is addressed to the lamp.

These systems have required complex and non-standard electronics. Moreover, the cable connecting the console to the lamps needs to have a large bandwidth and hence needs to be properly selected to maintain that large bandwidth.

Another issue of concern is the patent position. At least one entity has purported to have patented one or many techniques which are similar to the DMX-512 standard.

For all of the above reasons, an alternative to the DMX-512 standard is desirable.

One previous solution proposed by LIGHT & SOUND DESIGN™, the assignee of the present application, was to take a step backwards in the art by attaching a single wire from the controlling console to control each lamp separately. This required, however, an incredible amount of wiring in the console and hence many connectors on the console. Moreover, this would have required increasing the physical size of the console in order to accommodate the huge number of connectors.

The wiring problem can be further complicated since different manufacturer's lights have different advantages and uses. A lighting designer often specifies many different manufacturer's lamps within the show. This has required some way of controlling those multiple lamps, especially when those lamps communicate in different communications formats.

Control of the many proprietary formats has necessitated even more connections and connectors. This has the further possible drawback of requiring customized devices which may add to the cost.

In view of the above recognitions, the present disclosure forms an alternative system which avoids many of the above-discussed drawbacks of DMX and other similar systems, but which allows a relatively simple system. This system also allows provision for a remotely situated connector carrier. That connector carrier is easily reconfigured to accommodate many different formats of signals.

This is carried out according to the present system by using a console communication over a standard format line to an interface unit. That interface unit includes outputs for multiple connection formats. Multi-parameter lamps are controlled by using a separate dedicated channel for each lamp. However, this system as described herein also includes provision for allowing use of other data formats and other off the shelf equipment.

Yet another aspect of the present invention concerns the cost to develop and implement such structure. Design of totally new structures, of course, could prove extremely expensive.

Accordingly, another aspect of the invention is to use a available hardware structure, which can be programmed and reconfigured in multiple ways to allow inexpensive yet high flexible and reliable systems.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

Figure 1:
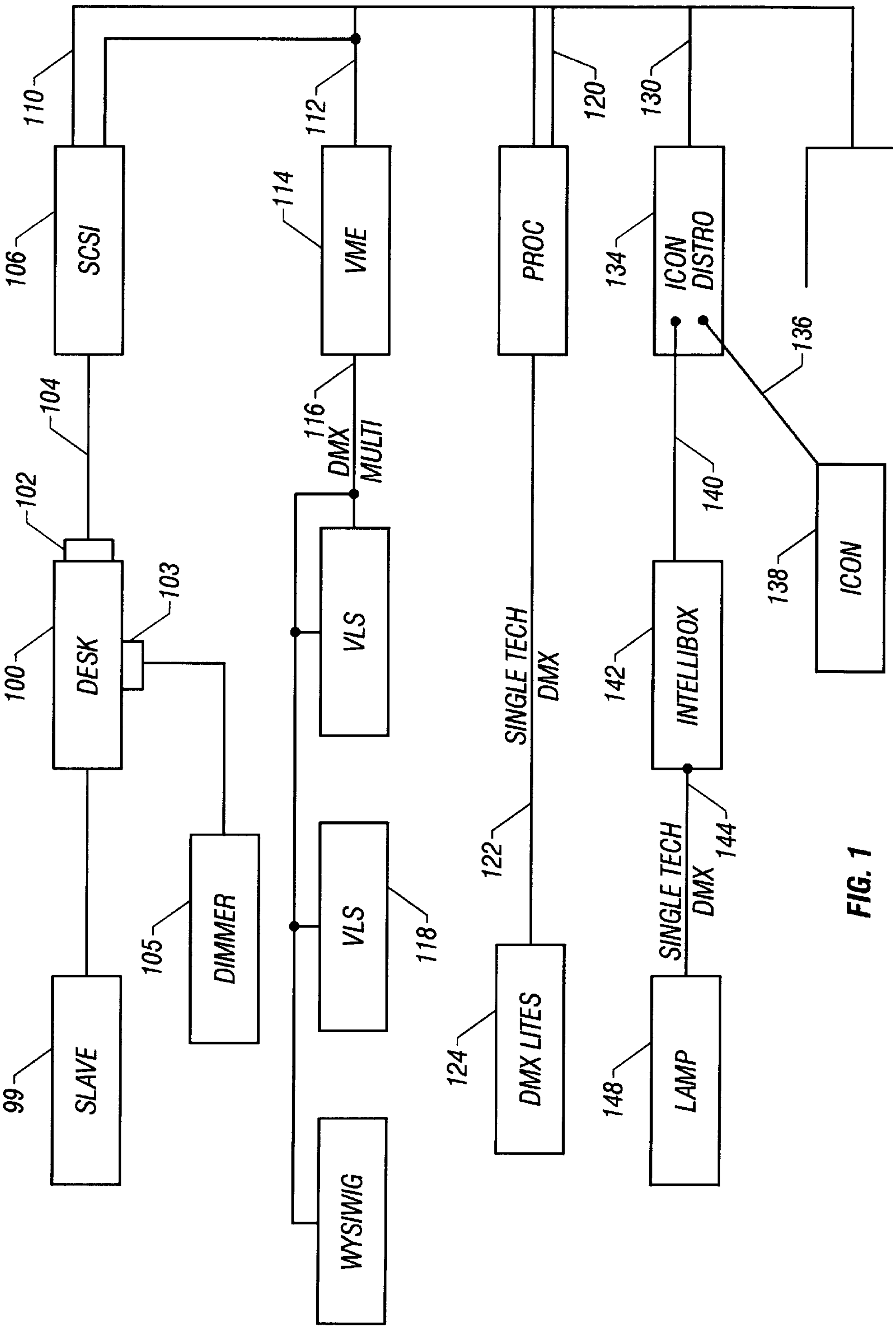
FIG. 1 shows a block diagram of the basic system of the embodiment.

A block diagram of a lighting system is shown in FIG. 1. The console 100 controls operations of the system. In some applications, an additional slave desk 99 may be used to allow certain operations to be controlled from a remote location. The dimmer rack 105 may also include a separate controller (not shown).

This embodiment reduces the number of connectors on the console 100. The console 100 preferably includes one single connector 102 which produces an interface signal of a standard computer format signal for computer data communications. That signal needs to carry a sufficient amount of data to carry all information for all multiple-parameter lamps. Another connection 103 provides information to dimmer rack 105.

Standard computer format interface signal is sent over line 104 to distribution rack 106. The preferred embodiment produces a Small Computer Systems Interface ("SCSI") signal as signal 104. The SCSI transfer protocol enables transfer of information at tens of megabits per second, enabling a single SCSI line to communicate sufficient information for most lighting systems. It should be understood that other standard format signals, including Ethernet, other network signals, IDE, PCI, Firewire or any other standard information transfer signal could alternatively be used. An important aspect of this feature is that all information, for controlled luminaires in the entire system, can be controlled using this single connector. The standard format signals described above use more than one line to carry signals for more than one luminaire. However, the number of lines of communicated information is less than a total number of stage lights being controlled.

One possible drawback of SCSI is its length limitation. The SCSI standard suggests that SCSI cables should be less than 15 feet in length. Accordingly, the SCSI distribution rack 106 in this embodiment should preferably be within fifteen feet of the console 100.

SCSI distribution rack 106 uses standard off-the-shelf SCSI hardware to carry out its operations. The ICON desk sends the SCSI information including commands appropriate times for the luminaires every lamp. These commands, moreover, can be to control luminaires which require multiple different formats. SCSI distribution rack 106 includes circuitry which translates these commands as described herein.

Figure 2:
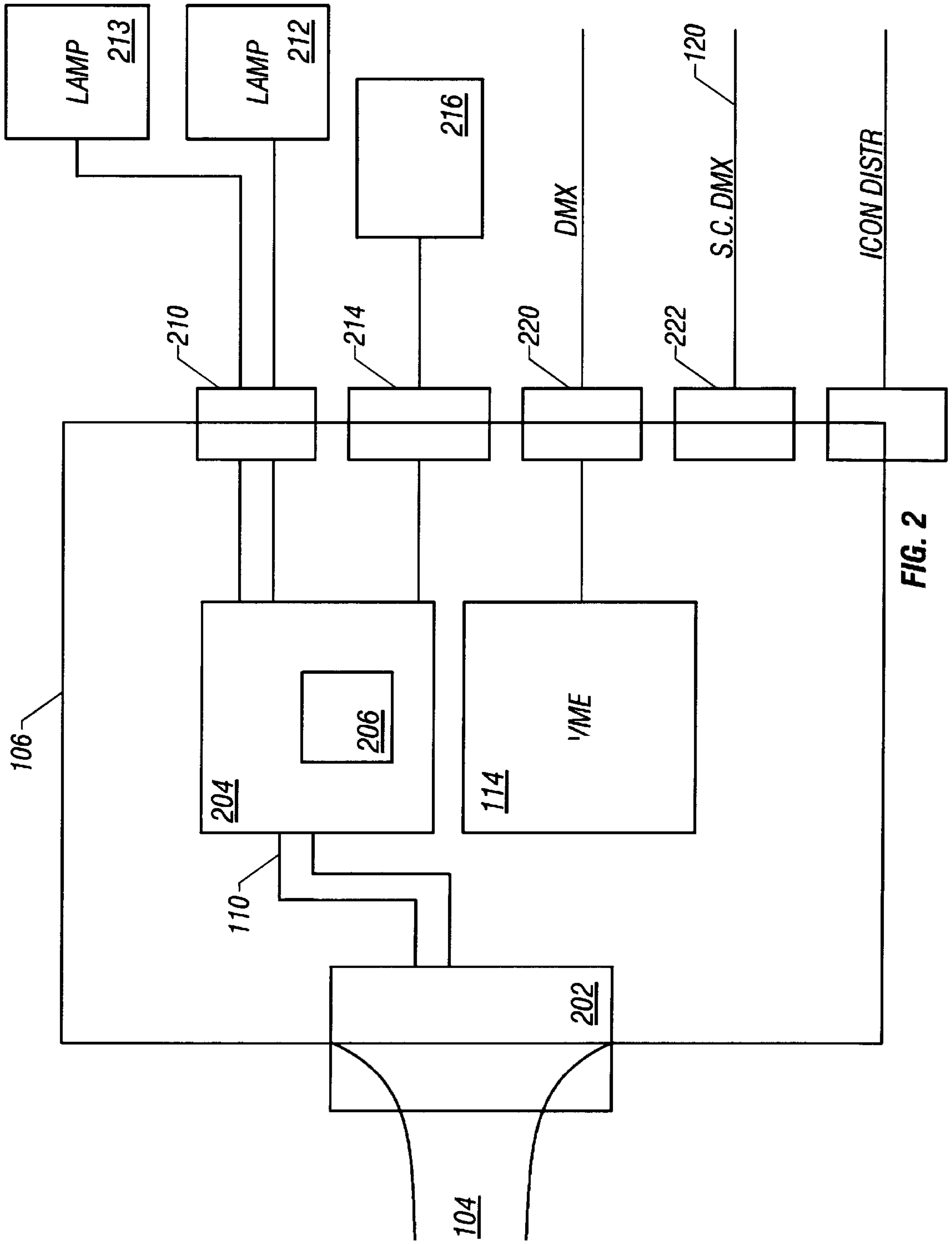
FIG. 2 shows a block diagram of the SCSI distribution rack.

FIG. 2 shows a block diagram of the physical structure of the SCSI distribution rack 106. SCSI distribution rack 106 includes a SCSI connector 202 receiving and terminating the information on SCSI cable 104 from console 100. The SCSI data is processed using SCSI interface cards 204 which use commercially available hardware to process the SCSI information. Each interface card 204 includes a microprocessor 206 operating according to a pre-stored sequence. The microprocessor that is used is preferably a TMS 320xx which extracts the SCSI information and re-channels it to provide one connector, e.g., 30 channels of information on output connector 210.

As explained more fully herein, each connector can control and communicate using one of a number of different communication formats. An important feature of this architecture is that a large number of connectors can be physically accommodated on the distribution rack, e.g. 500 connectors. Since the distribution rack can be physically spaced away from the console, it provides an extra surface for mounting of those connectors that does not interfere with the compact architecture of the console.

While SCSI is preferred in this embodiment, any high-bandwidth, standard (i.e., having its parts available off-the-shelf) format signal can be used for the communication from the console 100 to the distribution rack 106.

The information 110 from the SCSI transfer is output as a parallel data format with address, data, and strobe. The data is in the same form as it was on the memory access bus within the SCSI processor. 110 represents all the different kinds and formats of connectors and wires.

Connector 210 represents connections where each line controls one single lamp. These wires are connected, as shown, to lamps 212 and 213. Each connector 210 can control a number of single line lamps shown as 212 and 213. The preferred single channel protocol is ICON™ protocol as used by LIGHT & SOUND DESIGN.

The next connector 214 is connected to other single lamps such as 216.

The present system also includes the capability of controlling existing lamps using the DMX protocol. The preferred embodiment uses a VME card 114. VMG is a well known protocol, the details of which are described in, for example, publications of the VMEBUS International Trade Association. See http://www.vita.com.

The preferred device is a Motorola backplane card. The VME board is programmable, and is programmed as described herein to operate in different ways to emulate the different functions necessary according to the present invention.

A DMX signal is output on connector 220 and preferably used to control existing lamps within a stage show, such as the Vari-Lite VL5 lamps, which communicate using DMX. DMX is also used to supply information to WYSIWYG (available from Flying Pig Systems, Ltd., London, England), a data simulating product. WYSIWYG simulates the lighting effect. Hence, WYSIWYG receives information indicating at least a group of the lights. Many of those lights may also be controlled using the single channel protocols described herein.

As described above, the inventors noted certain limitations of time division multiplexed signals such as DMX-512. However, it is sometimes necessary to communicate with devices which communicate using this format. The details of DMX-512 protocol are described in USITT DMX-512 1990, available from USITT Inc., Suite 5A, 10 West 19th Street, New York, N.Y. 10011.

Another feature of this embodiment is the provision of a special output signal, called single channel DMX or "SC-DMX", that obviates many of these problems noted above. This special format follows the DMX-512 standard and hence allows communication with industry standard DMX-controlled fixtures. However, it does not require that multiple lamps be controlled over a single line.

Figure 2A:
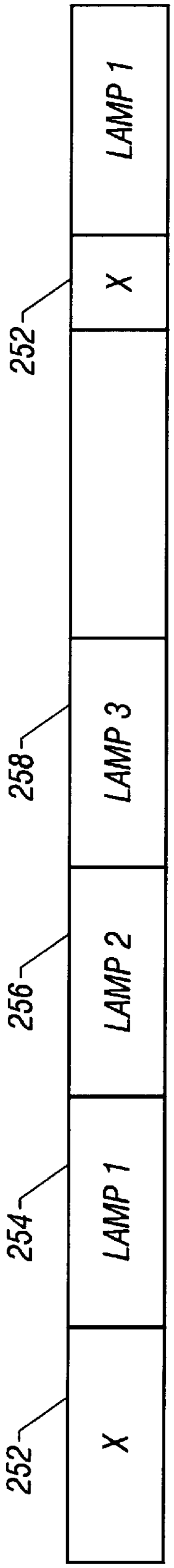
FIGS. 2A and 2B respectively show standard DMX time division multiplexing, and the modified SC-DMX timing as disclosed.
Figure 2B:
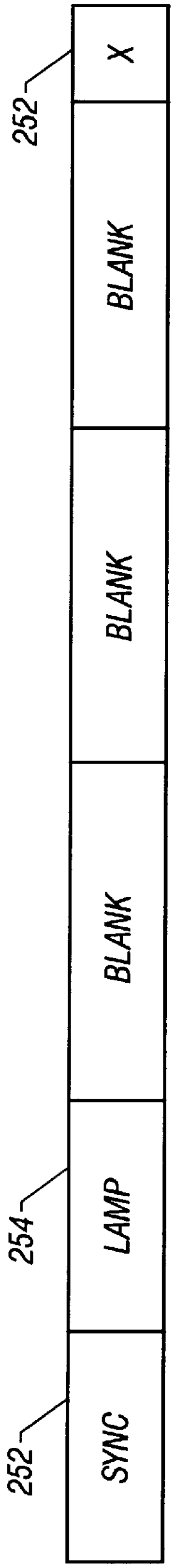

FIGS. 2A and 2B show how this operates. FIG. 2A schematically shows time division multiplexed communications such as DMX. A synchronization/overhead portion 252 indicates the beginning of a communication. The following time is broken into time slots 254, 256, 258, respectively intended for controlling lamps 1, 2 and 3. Each lamp responds only to the information in its time slot.

SC-DMX uses the same format, but places only a single message in each burst—always in time slot 1. SC-DMX runs the same software that is running in the ICON™ Lamps to thereby emulate the ICON operation and allow communication to the console, including sending and receiving appropriate messages. Hence, the SC-DMX element emulates the lamp operation.

The DMX VME board preferably has a 68040 processor which runs the software for 30 lamps. The processor also assembles the data for all 30 lamps and reformats data into standard or SC-DMX format. This produces messages of a length dependent on the data length to be sent, usually 12–30 bytes. The DMX protocol specifies a 24 byte minimum length. The inventors have found that most lamps will still communicate using shorter messages. When any fixture fails to respond to the DMX message, additional filling data can be added to lengthen the message.

This special format allows controlling existing lamps which require DMX without using a time division or address multiplexed system. The SC-DMX that is output on line 120 via connector 222 is a special format which emulates the DMX protocol, but does so without using time division multiplexing of multiple messages. In essence, this is a single channel per line device which uses the DMX protocol. The single channel DMX output 122 is coupled to a DMX lamp 124.

Yet another distribution path is via the ICON distribution interface 130. Interface 130 is also a 30 channel VME card: this one converting the ICON parallel format to 30 channels of ICON format. Each channel 136 is connected to an ICON unit 138. Another line 140 has different information for a different lamp, in ICON format. This system allows another technique of converting the preferred ICON format to another format to control another lamp. An a format former 142 converts between the ICON data that is input, and the desired output. Here, the desired output 144 is SC-DMX which is coupled to DMX lamp 148. An alternative technique of controlling single line per channel lamps connects to an ICON distribution rack 134. The ICON distribution rack 134 produces output for a single line per channel protocol 136 to control ICON lamps 138.

Figure 2C:
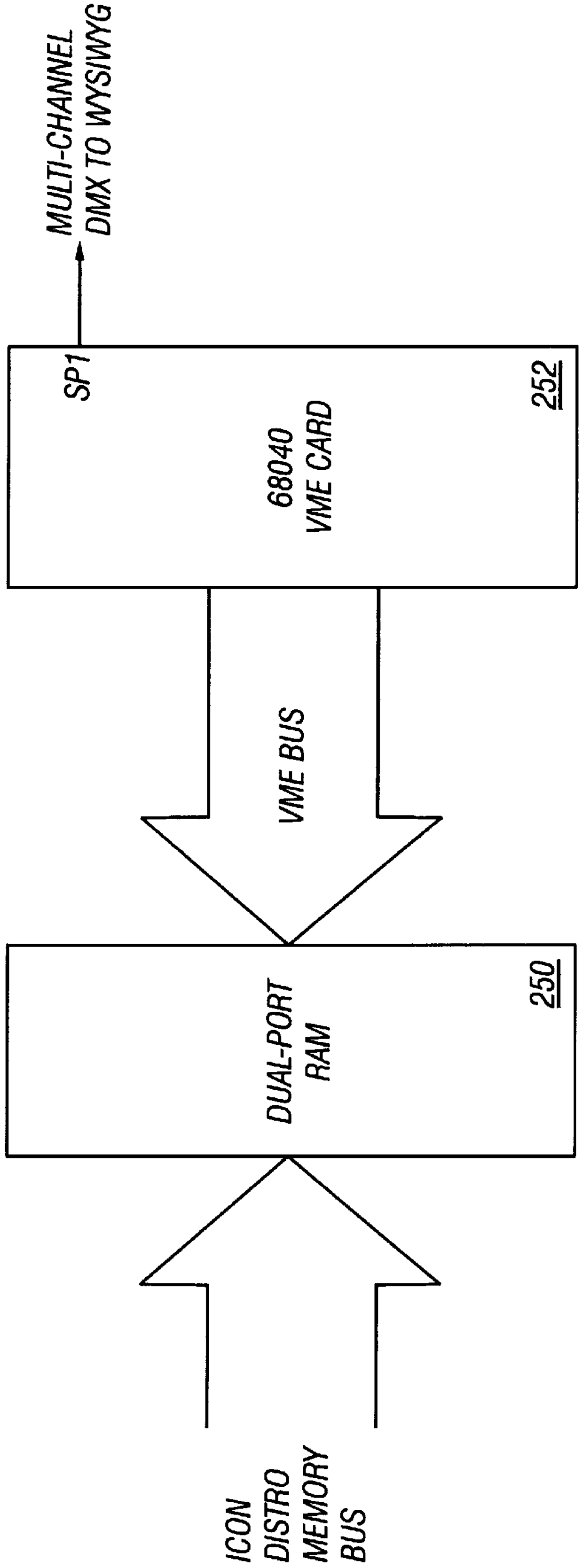
FIGS. 2C–2E show VME architectures.
Figure 2D:
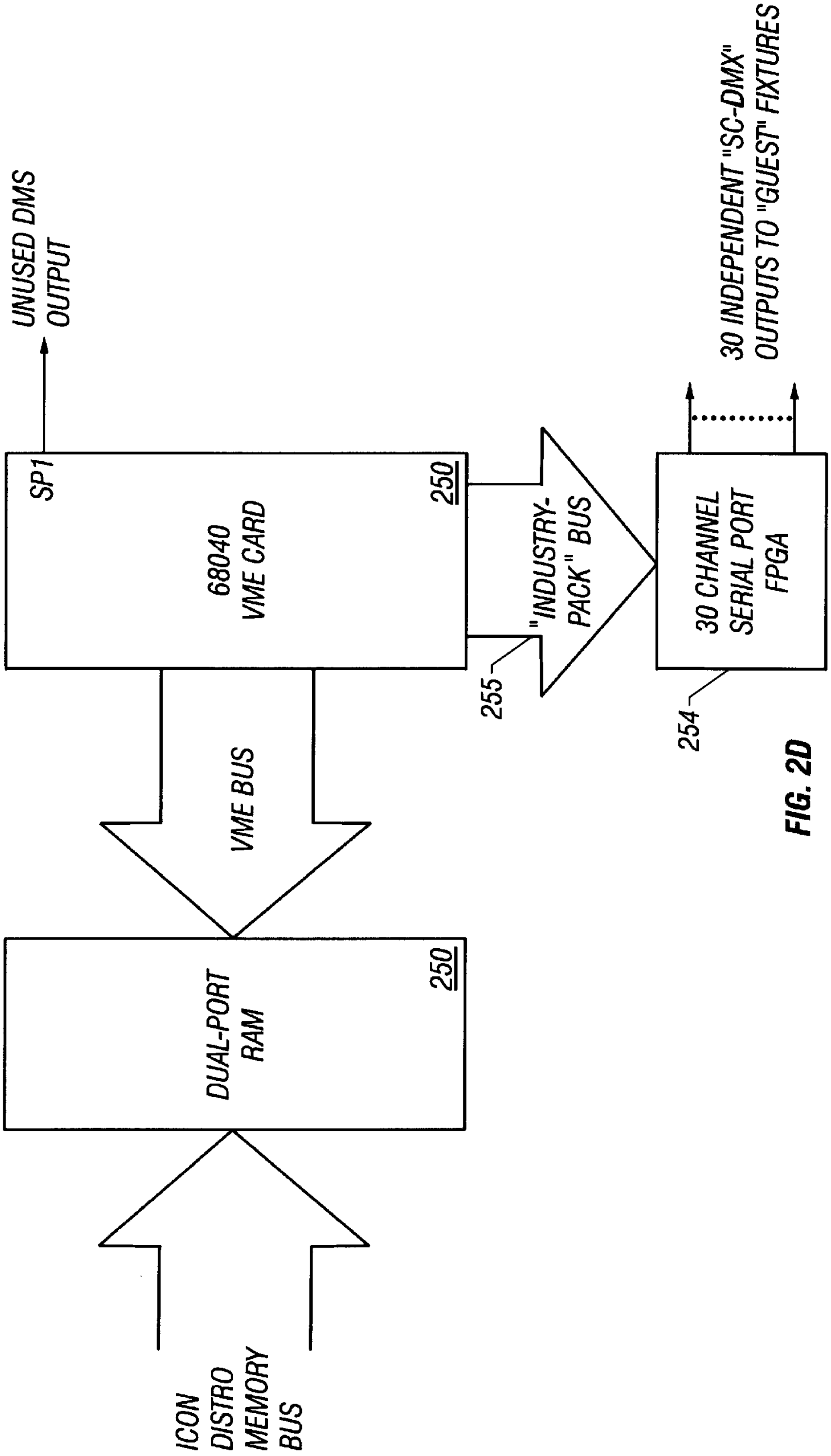

The VME system is quite flexible, and according to the present embodiment, is used in at least three different ways. FIG. 2C shows using the VME device in a distribution box architecture for running the WYSIWYG software. A dual port RAM 250 receives information in ICON format. This is output and is used to the VME card 252 which translates into standard DMX to control the WYSIWYG software. FIG. 2D shows using the VME architecture to form the "SC-DMX" output to the guest fixtures using dual port RAM 250, and VME call 250. The information is output over an "industry pack" bus 255 to an FPGA 254 configured as a 30 channel serial port device. This produces 30 independent SC-DMX outputs to guest fixtures.

Figure 2E:
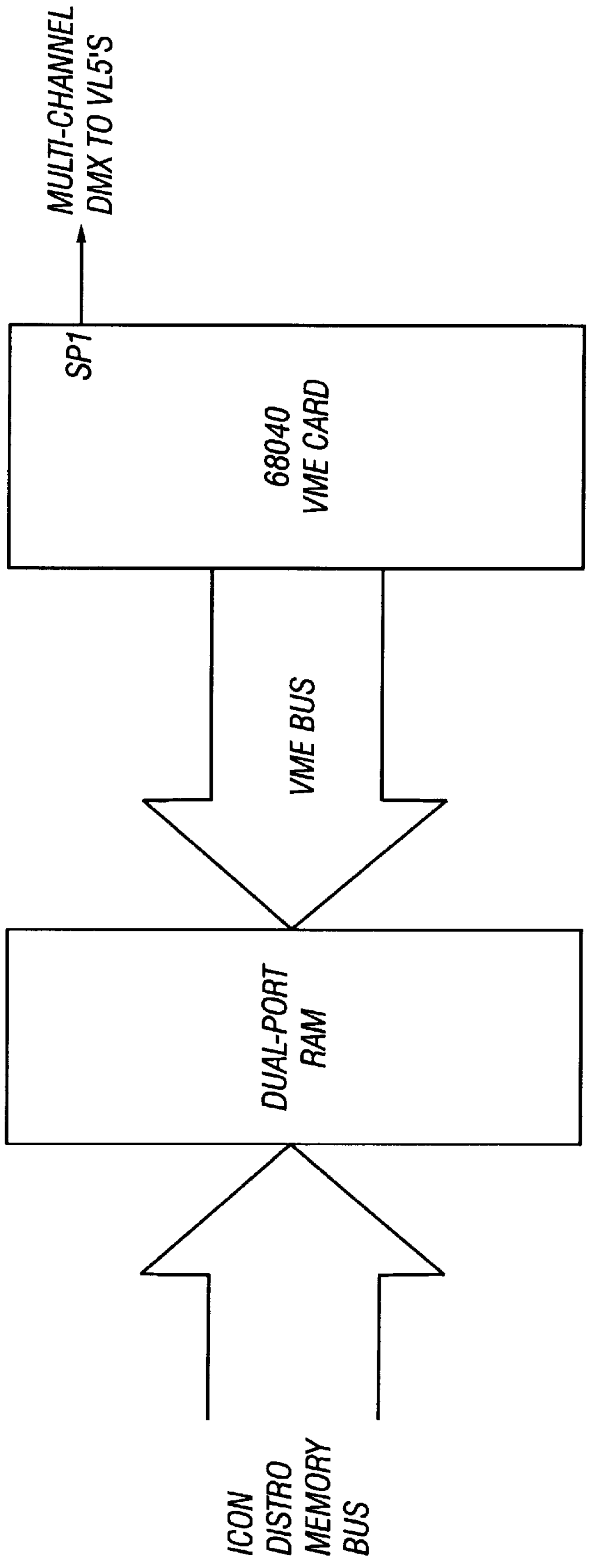

Finally, FIG. 2E shows using the existing distribution architecture to control real DMX systems such as Vari-Lite VL5 luminaires.

Figure 3:
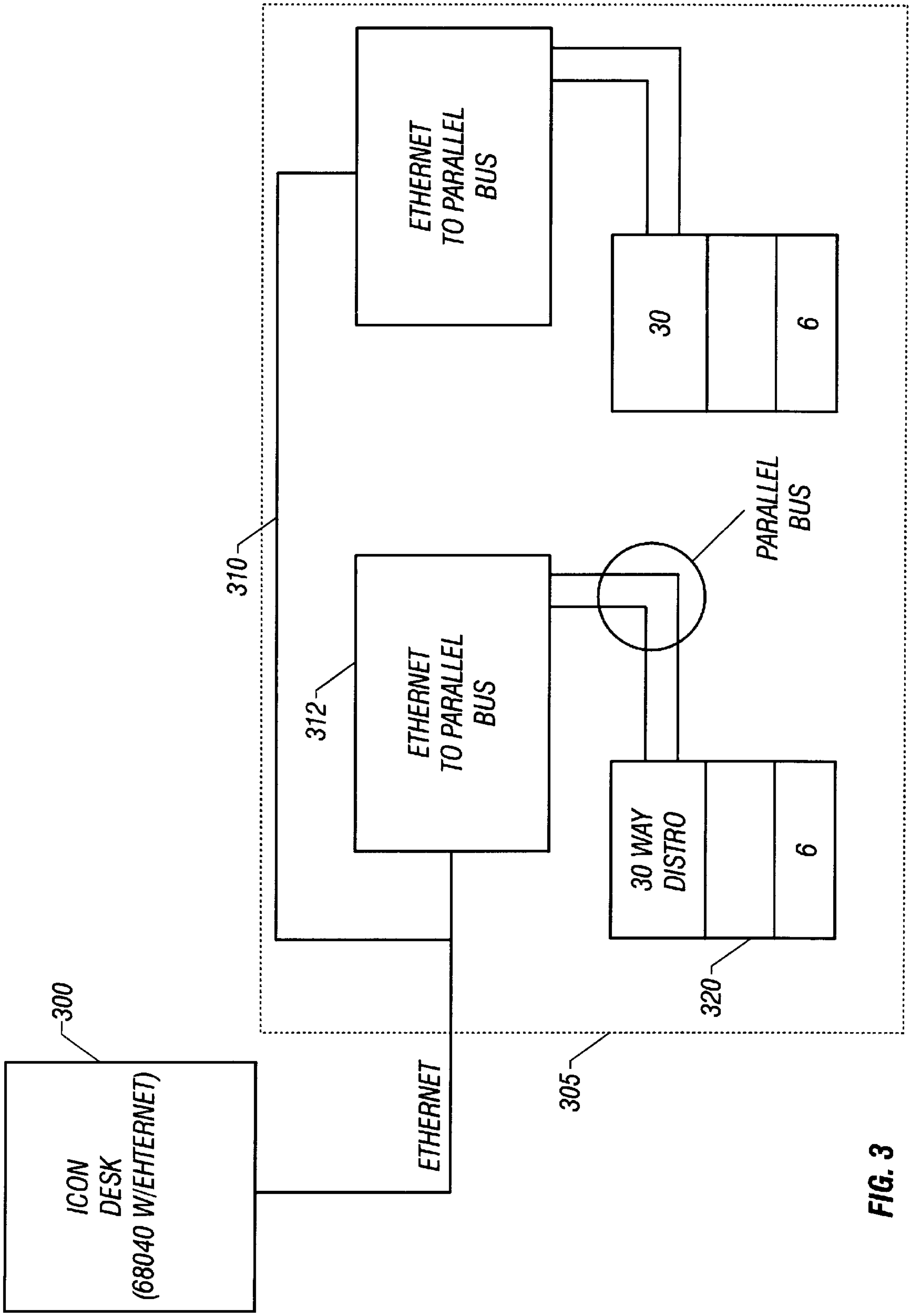
FIG. 3 shows an alternative architecture using Ethernet.

An alternative architectural system is shown in FIG. 3. This basic system still uses a similar system to that shown above in FIG. 1.

The modified ICON desk shown in FIG. 3 uses a 68040 processor with Ethernet capabilities. In this embodiment, the connection between the ICON desk 300 and the distribution rack 310 is via an ethernet link 305.

The distribution rack 310 includes a number of converters between Ethernet and parallel bus format. These ethernet to parallel bus converted devices can be made from standard off-the-shelf equipment, since they are conventionally used in personal computer equipment to connect between Ethernet and a parallel bus.

Each output of the distribution rack 310 goes itself to a distribution rack such as 320. The preferred output is parallel bus form, of a similar format to that used in a personal computer. This goes to a thirty-way distribution rack 320. Each distribution slot in the distribution rack includes six single channel (or other) outputs.

Many of the implementation details of the hardware described above use techniques that are conventionally employed in personal computer design and implementation and also those used in lighting design and designing and using DMX 512. The details of how to use and properly configure this hardware are well-known to those having ordinary skill in the art.

Although only a few embodiments have been described in detail above, those having ordinary skill in the art will certainly understand that many modifications are possible in the preferred embodiment without departing from the teachings thereof. For example, other formats besides those specifically mentioned herein can be used.

All such modifications are intended to be encompassed within the following claims.

What is claimed is:

1. A lighting control system for stage lighting control system comprising:

a lighting control console, having control mechanisms which operate to control a number of different types of stage lamps, said lighting control console having an output signal that has information for a plurality of said stage lamps, said output signal being in a standard format for computer systems;

a distribution rack, physically separated from said lighting control console, and receiving said output signal from said lighting control console, said distribution rack including a surface having a plurality of connectors, and interface circuitry which translates between said output signal from said lighting control console, and signals which are applied to said connectors, said connectors including:

a first connector which includes terminals which send information for lighting devices in which each lighting device is controlled over a dedicated line;

a second connector which includes terminals which send information for lighting devices which operate according to a time division multiplexed format, and in which only one time division multiplexed device is controlled over each separate line.

2. A lighting control system as in claim 1, wherein said standard format signal is SCSI.

3. A lighting control system as in claim 1, wherein said standard format signal is Ethernet.

4. A lighting control system for stage lighting comprising:

a lighting control console, having control mechanisms which operate to control a number of different types of stage lamps, said lighting control console producing a single output signal that has information for a plurality of said stage lamps, said output signal being in a standard format for data communication in computer systems;

a distribution device, physically separated from said lighting control console, and receiving said single output signal from said lighting control console, and converting said single output into a plurality of distribution outputs, said distribution outputs including at least:

a first output which provides information for lighting devices in which said information is in a time-division multiplexed format, but only a single lighting device is controlled over each line; and a second output which provides information for lighting devices in which said information is in a time-division multiplexed format, but multiple lighting devices are controlled over each line.

5. A lighting control system for a stage lighting control system comprising:

a lighting control console, having control mechanisms which operate to control a number of different types of stage lights, said lighting control console having an output signal that has information for a plurality of said stage lamps, said output signal being in a standard format for computer systems, and including a number of lines of communicated information, said number of lines being less than a total number of stage lights being controlled;

a distribution rack, physically separated from said lighting control console, and receiving said output signal from said lighting control console, said distribution rack including a surface having a plurality of connectors, and interface circuitry which translates between said output signal from said lighting control console, and signals which are applied to said connectors, said connectors including:

a first connector array which includes terminals which send information for lighting devices in which each lighting device is controlled over a dedicated line and a number of lines of which is the substantially the same as a total number of stage lights being controlled and at least one of said lights operates according to a time division multiplexed format; and a second connector array which includes terminals which send information for lighting devices which operate according to a time division multiplexed format.

6. A method of communicating with a stage light, comprising:

forming a time division multiplexed message, with a plurality of time slots in the message, each said time slot being intended for a different stage light;

placing desired information for only a desired one of said stage lights into only a single time slot of said message, and leaving other time slots, other than said single time slot, without information for other stage lights therein to form a single channel time division multiplexed message; and sending said single channel time division multiplexed message to a stage light that communicates in a time division multiplexed format, and thereby communicating with only said stage light using said single channel time division multiplexed format.

7. A method as in claim 6, further comprising forming another time division multiplexed message which includes information for a plurality of different stage lights in different ones of the time slots.

8. A method as in claim 6, further comprising forming another time division multiplexed message which includes information for a plurality of different stage lights in different ones of the time slots, and wherein information for at least said stage light controlled by said single channel time division multiplexed message is also included in said another time division multiplexed message.

9. A method as in claim 8, further comprising using said another time division multiplexed message to control lighting simulation software.

* * * * *